United States Patent
Kurtz

(10) Patent No.: US 7,512,765 B2
(45) Date of Patent: Mar. 31, 2009

(54) SYSTEM AND METHOD FOR AUDITING MEMORY

(75) Inventor: Robert G. Kurtz, Fairfax, VA (US)

(73) Assignee: Raytheon Company, Waltham, MA (US)

( * ) Notice: Subject to any disclaimer, the term of this patent is extended or adjusted under 35 U.S.C. 154(b) by 364 days.

(21) Appl. No.: 11/149,040

(22) Filed: Jun. 8, 2005

(65) Prior Publication Data

US 2007/0011428 A1 Jan. 11, 2007

(51) Int. Cl.
*G06F 12/00* (2006.01)
(52) U.S. Cl. .................... 711/170; 714/795
(58) Field of Classification Search ............ 711/170; 714/795
See application file for complete search history.

(56) References Cited

U.S. PATENT DOCUMENTS

| | | | | |
|---|---|---|---|---|
| 5,355,469 | A | 10/1994 | Sparks et al. ............. | 395/575 |
| 5,828,883 | A * | 10/1998 | Hall ........................ | 717/133 |
| 6,119,206 | A * | 9/2000 | Tatkar et al. ............. | 711/147 |
| 6,286,088 | B1 * | 9/2001 | Campbell et al. ......... | 711/165 |
| 6,560,773 | B1 * | 5/2003 | Alexander et al. ........ | 717/128 |
| 6,829,739 | B1 | 12/2004 | Wu .......................... | 714/719 |
| 7,181,585 | B2 * | 2/2007 | Abrashkevich et al. ... | 711/170 |
| 2005/0144412 | A1 * | 6/2005 | Swafford et al. ......... | 711/170 |
| 2005/0240747 | A1 * | 10/2005 | Raut ........................ | 711/170 |

FOREIGN PATENT DOCUMENTS

GB 2390793 A 3/2003

OTHER PUBLICATIONS

Declaration of Robert G. Kurtz dated Jun. 8, 2005.
"Rational PurifyPlus", IBM Software—Rational PurifyPlus—Family Overview, http://www-306.ibm.com/software/awdtools/purifyplus/, pp. 1-2, May 26, 2005.
"Rational Purify", IBM Software—Rational Purify—Family Overview, http://www-306.ibm.com/software/awdtools/purify/, pp. 1, May 26, 2005.
Notification of Transmittal of the International Search Report and the Written Opinion of the International Searching Authority, or the Declaration; International Application No. PCT/US2006/022506; 13 pages, Jul. 26, 2007.

(Continued)

*Primary Examiner*—Brian R Peugh
*Assistant Examiner*—Hashem Farrokh
(74) *Attorney, Agent, or Firm*—Baker Botts L.L.P.

(57) ABSTRACT

According to one embodiment of the invention, a method of auditing memory in a system comprises receiving a request for memory from an application and populating a memory tag with a stack depth component and a traceback stack component. The traceback stack component contains a pointer to a traceback stack. The stack depth component defines a size of the traceback stack. The traceback stack contains information from a program stack associated with the application. The embodiment may further comprise determining if a memory pool has enough free memory to satisfy the request and allocating, from the memory pool, a memory allocation unit if the memory pool has enough free memory to satisfy the request. The memory allocation unit may include a data area and a footer. The data area defines an area to which the application may write data and the footer bounds the data area with a special code.

10 Claims, 5 Drawing Sheets

OTHER PUBLICATIONS

Ivan Skytte Jorgensen; "Hunting Memory Bugs;" EDM/2; XP-002441825, http://web.archive.org/web/19980209230308/http://www.edm2.com; 7 pages, Jul. 7, 2007.

Robert Benson; "Identifying Memory Management Bugs Within Applications Using the Iibumem Library;" Sun Microsystems; XP-002441826; http://web.archive.org/web/20030626214800/http://access1.sun.com; (internet date Jul. 10, 2007); 10 pages, Jun. 2003.

Jeff Campbell; "Memory Profiling for C/C++ with IBM Rational Test RealTime and IBM Rational PurifyPlus RealTime;" http://web.archive.org/web/20051013075737/http://www-128.ibm . . . ; (internet date Jul. 10, 2007); 7 pages, Apr. 27, 2004.

* cited by examiner

Task [AsgMgr (0x039d5a30)] [allocated] [12] bytes at [0x03781a30] ( [292] occurrences)

```
Frame #       return adr      name
    0         0x00199adc      malloc + 0x00000014
    1         0x0026827c      _builtin_new + 0x00000028
    2         0x0091c180      dump_6HtlnWk + 0x00000560
    3         0x0091be9c      dump_6HtlnWk + 0x0000027c
    4         0x00920dbc      _GLOBAL_$I$_6HtlnWkR7AsmtGrpR6MgrRptR5SqR_i + 0x000006e4
    5         0x0091a680
Up_6HtlnWkUIdUIRC20_IDL_SEQUENCE_HitUsRC16EVENT_PARAMETERSUIIR8DfTimLstT9b +
0x000001a8
    6         0x0089b13c
SUp_8AsgMgr_idUIRC20_IDL_SEQUENCE_HitUsRC16EVENT_PARAMETERSUII + 0x000002dc
    7         0x00947ea8
Up_6SR_idUIRC20_IDL_SEQUENCE_HitUsRC16EVENT_PARAMETERSUIIR17CORBA_Environment +
0x00000064
    8         0x0095898c      _GLOBAL_$I$_6SR_i + 0x0000c200
    9         0x01597e14      dispatch_15SRpt_dispatchR13CORBA_RequestUcPv +
0x00000234
    10        0x01aea060
continueDispatch_13ContextClassSR8RequestSP12CORBA_FilterP10CORBA_PPTR + 0x00000100
    11        0x01aea538      dispatch_13ContextClassSR8RequestS + 0x0000024c
    12        0x01adfa04      dispatch_12FRRInterfaceP8RequestS + 0x0000004c
    13        0x01ae7350      processIncomingMsg_7Channel P14ChannelMessage +
0x00000064
    14        0x01afd444      processNextEvent_12EventHandlerUI + 0x000000b8
    15        0x01adf82c      processNextEvent_12FRRInterfaceUI + 0x00000030
    16        0x01af0160      processNextEvent_9CORBA_BOAUIR17CORBA_Environment +
0x000000b4
    17        0x01b10440      processNextEvent_12CORBA_VX_BOAUIRI7CORBA_Environment +
0x00000014
    18        0x00827134      AsgMgrSvMain + 0x000004c4
    [19]      [0x0026765c]    [vxTaskEntry + 0x00000060]
```

FIG. 6

SYSTEM AND METHOD FOR AUDITING MEMORY

GOVERNMENT FUNDING

The U.S. Government may have certain rights in this invention as provided for in the terms of Contract No. F09604-03-D-0007.

TECHNICAL FIELD OF THE INVENTION

This invention relates generally to the field of computers and, more particularly, to a system and method for auditing memory.

BACKGROUND OF THE INVENTION

Software developers often encounter problems with memory resources due to subtle coding errors. Typical memory management problems include memory leaks, memory overruns, lack of memory, and de-allocation errors. With such memory management problems, applications can crash, making debugging efforts difficult.

SUMMARY OF THE INVENTION

According to one embodiment of the invention, a method of auditing memory in a system comprises receiving a request for memory from an application and populating a memory tag with a stack depth component and a traceback stack component. The traceback stack component contains a pointer to a traceback stack. The stack depth component defines a size of the traceback stack. The traceback stack contains information from a program stack associated with the application. The embodiment may further comprise determining if a memory pool has enough free memory to satisfy the request and allocating, from the memory pool, a memory allocation unit if the memory pool has enough free memory to satisfy the request. The memory allocation unit may include a data area and a footer. The data area defines an area to which the application may write data and the footer bounds the data area with a special code.

Certain embodiments of the invention may provide numerous technical advantages. For example, a technical advantage of one embodiment may include the capability to detect memory overruns. Another technical advantage of another embodiment may include the capability to analyze the source of a memory problem.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of example embodiments of the present invention and its advantages, reference is now made to the following description, taken in conjunction with the accompanying drawings, in which:

FIG. 6 is an embodiment of a listing, according to an embodiment of the invention;

DETAILED DESCRIPTION OF EXAMPLE EMBODIMENTS OF THE INVENTION

It should be understood at the outset that although example embodiments of the present invention are illustrated below, the present invention may be implemented using any number of techniques, whether currently known or in existence. The present invention should in no way be limited to the example embodiments, drawings, and techniques illustrated below, including the embodiments and implementation illustrated and described herein. Additionally, the drawings are not necessarily drawn to scale.

Software developers often encounter problems with memory resources due to subtle coding errors. Typical memory management problems include memory leaks and memory overruns. Memory leaks occur when memory is allocated to a program from a free memory pool or heap and then never returned or de-allocated after the program finishes using the memory. Such an occurrence may be repeated over and over as the program continues to request more memory and neglects to return the subsequently requested memory. Over time, the amount of available memory in the free memory pool or heap can decrease to such an extent that the system, utilizing the memory, becomes inoperable. In such circumstances, the application will crash, making debugging efforts difficult.

Memory overruns occur when a program allocates a specified amount of memory and then writes a larger amount of data than that which was allocated. The excess data spills over the end of the allocated memory, possibly overwriting memory allocated for other uses. Overruns such as this may result in unexpected asynchronous corruption of memory. Similar to the memory leaks described above, the application may crash.

Another memory management problem includes an application attempting to allocate an amount of memory larger than an amount of free memory available in the memory pool. Yet another memory management problem includes a de-allocation failure in which an application attempts to de-allocate memory, but the operating system cannot accept the return of the memory because the return address of the memory is invalid (e.g., if the memory was not originally allocated from the memory pool).

Commonly-used programming languages such as C and C++ do not provide native protection against memory management problems. Real-time operating systems such as VxWorks provide minimal tools for detecting and troubleshooting memory problems. Enhancing the problem in real-time operating systems is the fact that programmers have poor visibility into what is going on in the computer. Accordingly, teachings of some embodiments of the invention recognize a system and method for detection of leaked memory blocks. Teachings of further embodiments of the invention recognize a system and method for detection of memory block overruns.

Teachings of yet further embodiments of the invention recognize a system and method for identification of the origin of memory problems.

Figure 1:
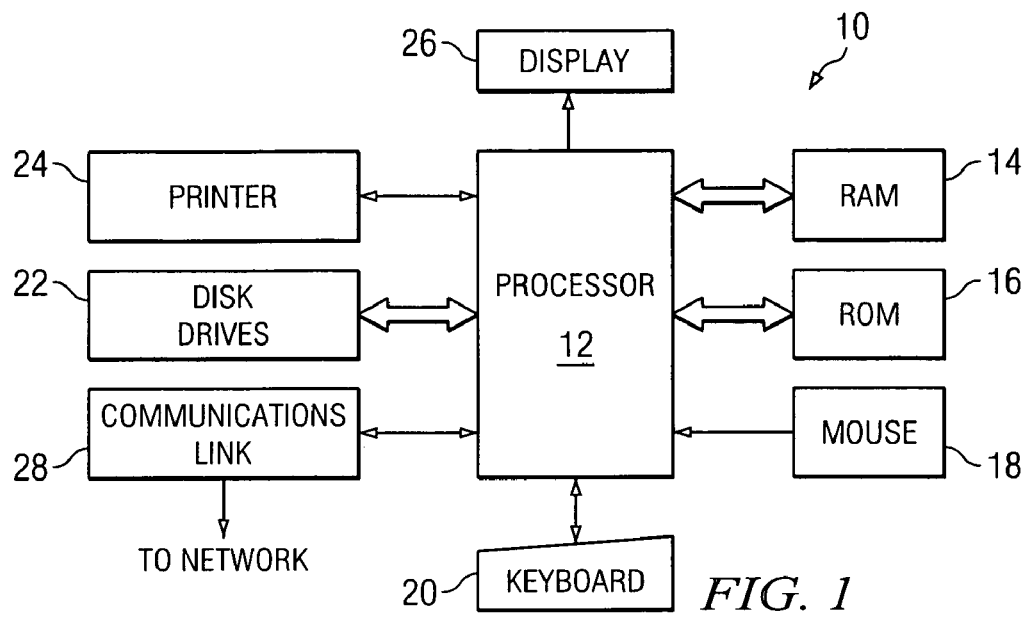
FIG. 1 is an embodiment of a general purpose computer that may be used in connection with one or more pieces of software employed by other embodiments of the invention.

FIG. 1 is an embodiment of a general purpose computer 10 that may be used in connection with one or more pieces of software employed by other embodiments of the invention. General purpose computer 10 may generally be adapted to execute any of the well-known OS2, UNIX, Mac-OS, Linux, and Windows Operating Systems or other operating systems. The general purpose computer 10 in the embodiment of FIG. 1 comprises a processor 12, a random access memory (RAM) 14, a read only memory (ROM) 16, a mouse 18, a keyboard 20 and input/output devices such as a printer 24, disk drives 22, a display 26 and a communications link 28. In other embodiments, the general purpose computer 10 may include more, less, or other component parts.

Embodiments of the present invention may include programs that may be stored in the RAM 14, the ROM 16 or the disk drives 22 and may be executed by the processor 12. The communications link 28 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; radio communications; a satellite network; an enterprise intranet; other suitable communication links; or any combination of the preceding. Disk drives 22 may include a variety of types of storage media such as, for example, floppy disk drives, hard disk drives, CD ROM drives, DVD ROM drives, magnetic tape drives or other suitable storage media. Although this embodiment employs a plurality of disk drives 22, a single disk drive 22 may be used without departing from the scope of the invention.

Although FIG. 1 provides one embodiment of a computer that may be used with other embodiments of the invention, such other embodiments may additionally utilize computers other than general purpose computers as well as general purpose computers without conventional operating systems. For example, other embodiments of the invention as described below may include embedded systems executing VxWorks or other suitable operating systems. Examples of such embedded systems include, but are not limited to computer systems utilized in a vehicle or computer systems utilized in an airborne aircraft. Additionally, embodiments of the invention may also employ multiple general purpose computers 10 or other computers networked together in a computer network. Most commonly, multiple general purpose computers 10 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 1, the logic comprises computer software executable on the general purpose computer 10. The medium may include the RAM 14, the ROM 16 or the disk drives 22. In other embodiments, the logic may be contained within hardware configuration or a combination of software and hardware configurations. The logic may also be embedded within any other suitable medium without departing from the scope of the invention.

Figure 2:
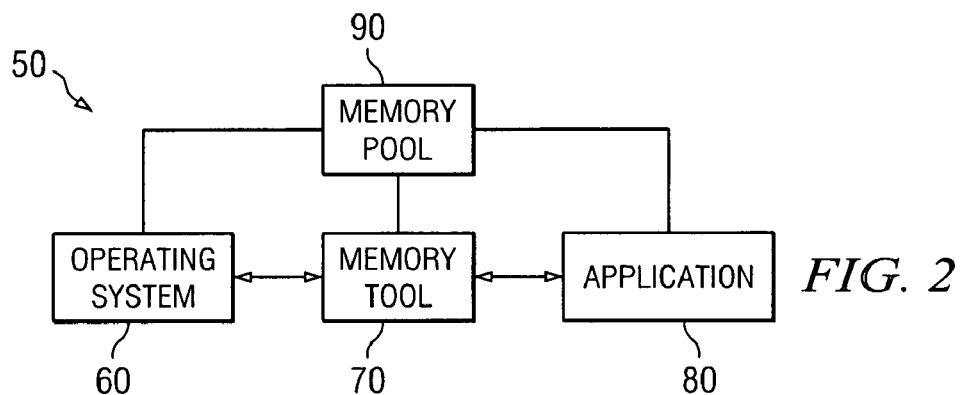
FIG. 2 shows a system for managing memory, according to an embodiment of the invention.

FIG. 2 shows a system 50 for managing memory, according to an embodiment of the invention. The system 50 may be any of a variety of systems that process data, including, but not limited to, the general purpose computer 10 described in FIG. 1 (e.g., including desktop computers) and embedded systems, including real-time embedded systems. The system 50 in this embodiment includes an operating system 60, a memory tool 70, applications 80, and a memory pool 90. The operating system 60 may be any of variety of operating systems, including, but not limited to, DOS, OS2, UNIX, Mac-OS, Linux, Windows, and VxWorks. Although not explicitly shown, the operating system 60 may include any of a variety of components typically utilized in operating systems 60 to help manage systems 50. For example, operating system 60 may include a kernel that manages the hardware resources of system 50, for example, a processor and memory.

The memory tool 70 allocates memory from the memory pool 90 to the applications 80 and audits the usage of such memory. In the embodiment of FIG. 2, the memory tool 70 is shown communicatively positioned between the operating system 60 and the application 80. In some embodiments, the memory tool 70 may be integrated with portions of the operating system 60, for example, the operating system's memory management library (not explicitly shown). In other embodiments, the memory tool 70 may replace the portions of the operating system 60 that manage memory. In yet further embodiments, the memory tool 70 may be utilized separate from the operating system 60, serving as an intermediary between the operating system 60 and the application 80. Further details of the memory tool 70 are described below.

The memory pool 90 may include any of a variety of different media operable to store data. The applications 80 may generally include a variety of logical programs encoded in software, hardware, or a combination of software and hardware. In operation, the application 80 for whatever reason may request an allocation of memory from the memory tool 70. In requesting this allocation of memory, the memory tool 70 in some embodiments (e.g., embodiments where the memory tool 70 is separate from the operating system 60) may be positioned in such a manner that the application 80 believes its is communicating with the memory management libraries of the operating system 60.

Figure 3:
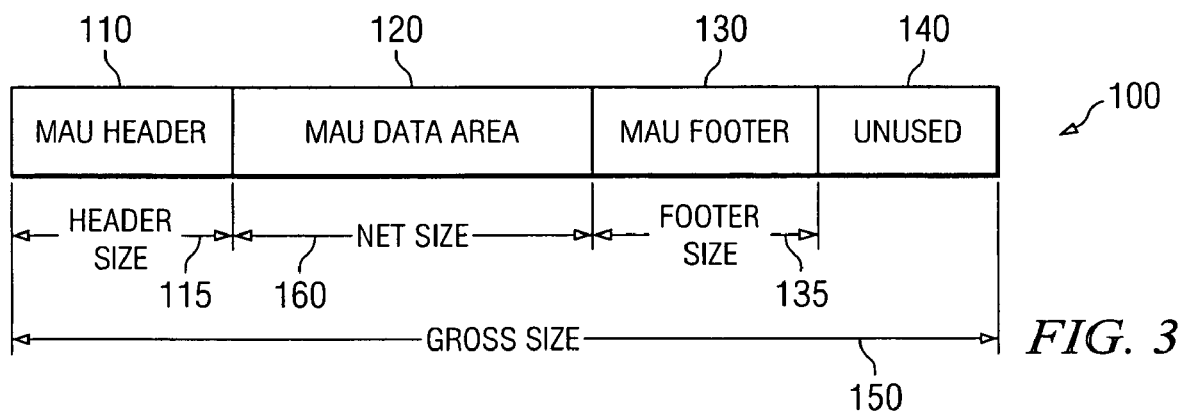
FIG. 3 show a memory allocation unit, according to an embodiment of the invention.

FIG. 3 shows a memory allocation unit 100, according to an embodiment of the invention. The memory allocation unit 100 may generally define an individual block of memory in memory pool 90 of FIG. 2. The memory allocation unit 100 of the embodiment of FIG. 3 includes a header 110, a data area 120, a footer 130, and an unused data portion 140. A gross size 150 may generally represent the total number of bytes occupied by the memory allocation unit 100. The gross size 150 in some embodiments may be dependent on the particular operating system and/or memory utilized. A net size 160 may generally represent the number of bytes available for allocation to the application 80 in the data area 120. A header size 115 may generally represent the number of bytes used in the header 110 and a footer size 135 may generally represent the number of bytes used in the footer 130. In the embodiment of FIG. 3, the net size 160 is smaller than the gross size 150 by at least the overhead, for example, the header size 115 and the footer size 135. In some embodiments, the memory allocation units 100 may be organized into discrete gross sizes, for example, gross sizes ranging from 32 bytes to 64 megabytes.

When memory is allocated, the memory tool 70, among other items, may initialize the header 110 and the footer 130. The header 110, may include a valid flag (e.g., set to MAU_valid_flag_allocated), an indication of the net size of the memory allocation unit 100 (in bytes), and a gross size of the memory allocation unit 100 (in bytes). The data area 120 may include the data from application 80, with contents as may be written and read by the application. The MAU footer 130 bounds the data area 120 by utilizing a special code or sequence that may later be identified. If, for some reason, an application 80 writes beyond the allocated data area 120 (e.g., due to any of a variety of subtle coding errors), the application 80 may write over the special code or sequence, changing the MAU footer 130. Preferably, the special code or sequence utilized in the MAU footer 130 is one that has a small statistical likelihood of being used in the data area 120. In some embodiments, the special code may be the same for every footer 130 in the memory allocation unit 100. In other embodiments, the special code may be different for different footer 130 in the memory allocation unit 100.

The unused data area 140 may generally include the remainder bytes available up to the gross size 150 of the memory allocation unit 100.

When memory is de-allocated the memory tool 70 may analyze the MAU header 110 to ensure that the memory allocation unit 100 is valid. A variety of validation techniques may be utilized as will become apparent to one of ordinary skill in the art. The memory tool 70 may additionally analyze the MAU footer 130 to detect whether or not the application 80 wrote more memory than it was allocated in the data area 120, for example, an overrun process. As an example, the memory tool 70 may analyze the footer 130 to see if the special code or sequence changed. Further details of allocation and de-allocation will be described below with reference to FIGS. 7 and 8.

Each time the memory tool 70 encounters a memory event, for example, allocation of memory allocation units 100 or detection of a memory errors, a memory tag 200 may be created. Further details of the memory tag 200 are described below with reference to FIGS. 4 and 5.

Figure 4:
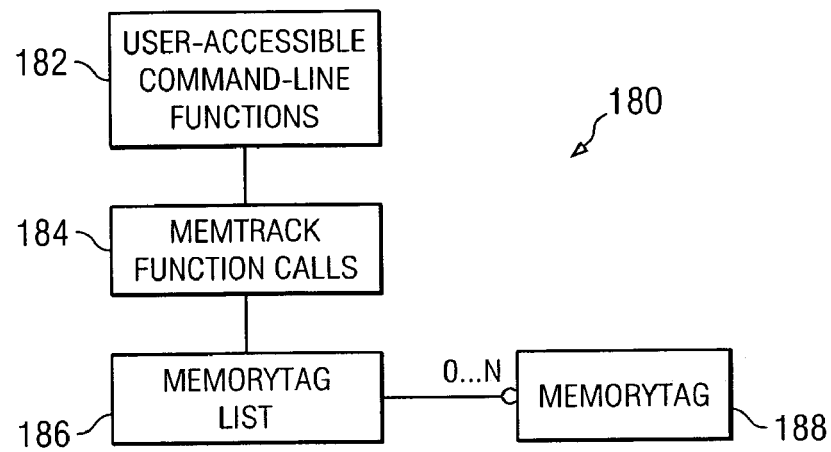
FIG. 4 is a diagram representing an object oriented architecture of a memory tool, according to an embodiment of the invention.

FIG. 4 is a diagram, representing an object oriented architecture 180 of the memory tool 70, according to an embodiment of the invention. The object oriented architecture includes a command line component 182. The command line component 182 make use of a function call component 184, which represents function calls which are internal functions of the memory tool 70. The internal function calls of the function call component 184 make use of a memory tag list component 186. The memory tag list component represents a memory tag list containing a list of zero or more memory tags 200, represented by memory tag object component 188.

Although the embodiment of FIG. 4 gives an object oriented architecture 180 that may be utilized in, for example, a VxWorks operating system, other object oriented architectures may be utilized for other operating systems in other embodiments.

Figure 5:
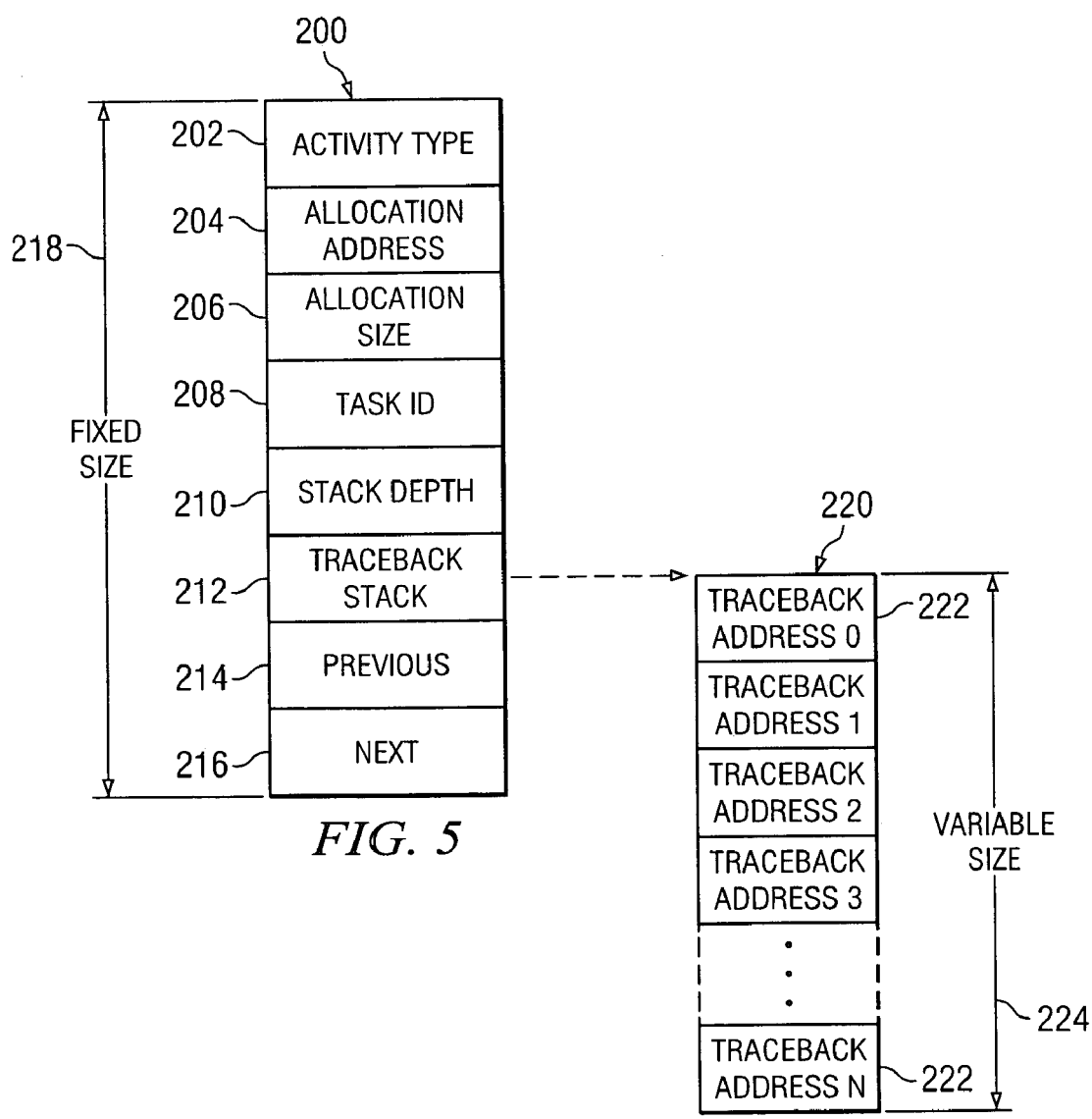
FIG. 5 shows a memory tag, according to an embodiment of the invention.

FIG. 5 shows a memory tag 200, according to an embodiment of the invention. The memory tag 200 in this embodiment includes an activity type component 202, an allocation address component 204, an allocation size component 206, a task identification (ID) component 208, a stack depth component 210, a traceback stack component 212, a previous flag component 214 and a next flag component 216. The activity type component 202 represents a flag, corresponding to the particular type of activity involved with the memory request or event associated with the creation of the memory tag 200. For example, the activity type component 202 may have a flag of ALLOCATION, ALLOCATION ERROR, OVERRUN, or INVALID DE-ALLOCATION, among other flags. Further details of the activity type will be described below with reference to FIGS. 7 and 8.

The allocation address component 204 is the address of the memory, for example, with respect to the memory pool 90 that was involved in the particular event for which the memory tag 200 was created. The allocation size component 206 represents the amount of memory involved in the event or memory request and the task ID component 208 identifies the task in the application or program is involved with the event or memory request.

The stack depth component 210 represents the depth of a trace-back stack 220, associated with a particular event or memory request. The traceback stack 220 may be derived from a program stack of the application or program involved in the particular event or memory request for which the memory tag 200 is being created. A program stack as will be recognized by one of ordinary skill in the art may generally represent a data structure, which a computer uses to implement function calls among numerous other applications. In various embodiments of the invention, the memory tool 70 may read the return addresses in the program stack and copy such addresses into the traceback stack 220. Accordingly, the traceback stack 220 in this embodiment includes various traceback addresses 222, which correspond to the addresses in the program stack associated with the application or program making the memory request. Although traceback addresses 222 have been shown in the traceback stack 220 in this embodiment, in other embodiments the traceback stack 220 may include other information.

The traceback stack component 212 contains a pointer to the traceback stack 220. Accordingly, the memory tag 200 may have a fixed size 218 and the traceback stack 220 may have a variable size, dependent on the number of addresses in the program stack associated with the particular event or memory request.

The previous component 214 and the next component 216, provides a linked list of memory tags 200. That is, each of the memory tags 200 may have a pointer to the memory tag before it in the list and the memory tag after in the list. Although the memory tags 200 have been described as being organized in a list, a variety of other organization schemes may be utilized to organize the memory tags 200.

FIG. 6 is an embodiment of a listing 300, according to an embodiment of the invention. The listing 300, for example, may be a listing derived from one or more memory tags 200 of FIG. 4. In the first line of the listing 300, portion 302 represents the task name and ID of the task which initiated the event or memory request, portion 304 represents the memory operation, portion 306 represents the size of the operation, portion 308 represents the address of dynamic memory (or one of them if they are multiple events), and portion 310 represents the number of times a similar event occurred (e.g., events having the same task, size, and traceback information). Accordingly, we can see that an AsgMgr task was allocated 12 bytes of memory 292 times. Information such as this may be an alarm that a memory leak has occurred, depending on the particular task being analyzed.

The lower portion of the listing 300 gives additional information about the particular event, for example, as derived at least partially from the traceback stack 220 of FIG. 3. In the lower portion of the listing 300, portion 312 represents the most recently called stack frame (e.g., frame "0") and portion 316 indicates the task entry point (e.g., frame "19"). For each frame or row, portion 318 indicates the raw return address and portion 320 represents the symbol name (e.g., mangled C++ name, which gives method and class plus hints about argument types) immediately preceding return address along with the offset from symbol name to return address.

For each item, an address in memory is stored. The address may be converted into a name and offset, for example, using a symbol table from an operating system or other suitable component. The listing 300 thus indicates information concerning a particular location in the executing of particular application or program in which the event or memory request associated with the memory tag 200 took place. Analyzing the listing 300, a programmer may be able to debug coding errors and/or account for location of errors.

Figure 7:
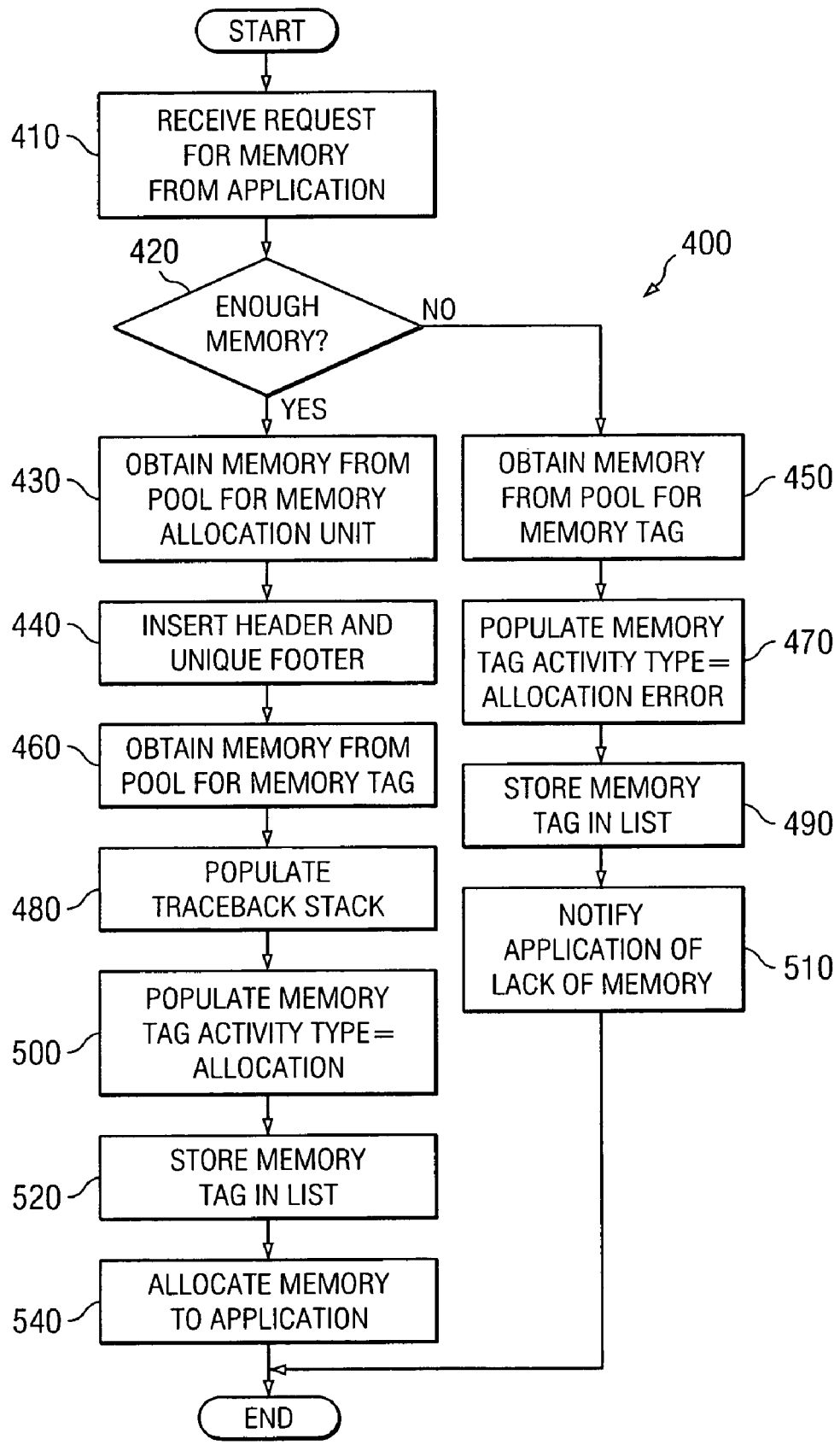
FIG. 7 shows a flow diagram for an allocation process.

FIG. 7 shows a flow diagram for an allocation process 400, according to an embodiment of the invention. In illustrating the allocation process 400 of FIG. 7, reference is also made to FIGS. 2, 3, and 5. For whatever reason, a program or application 80 may make a request for memory. Accordingly at step 410, the memory tool 70 receives the request.

Upon receiving the memory request, the memory tool 70, either by itself or with assistance from the operating system 60, determines if enough memory is present in the memory pool 90 to satisfy the memory request. If so, the allocation process 400 proceeds by obtaining memory from the memory pool 90 for a memory allocation unit 100 at step 430. Then, a header 110 and a footer 130 may be placed in the memory allocation unit 100 at step 440. As referenced briefly above, preferably the footer 130 is a special sequence of data that has a low statistical likelihood of representing data that will be placed in the data area 120 of the memory allocation unit 100.

The allocation process 400 then proceeds by obtaining additional memory from the memory pool 90 to construct a memory tag 200 and traceback stack 220 at step 460. As referenced above, in some embodiments the memory tag 200 may have a fixed size 218 and the traceback stack 220 may have a variable size 224. Prior to or in conjunction with populating the memory tag 200 at step 500, the allocation process 500 populates the traceback stack 220 with traceback addresses 222 at step 480. In some embodiments, this may be done by reading a program stack associated with the original request at step 410 and copying the return addresses in the program stack to the traceback stack 220. As referenced above, the traceback stack 220 may have a variable size 224, dependent on the current size of the program stack for the program or application 80 making the memory request. The size of the program stack may vary continually as additional functions are called and shrink as those functions return.

In populating the memory tag 200, an activity type component 202, an allocation address component 204, an allocation size component 206, a task identification (ID) component 208, a stack depth component 210, a traceback stack component 212, a previous flag component 214 and a next flag component 216 may be completed. The particular activity type for the activity type component 204 in step 500 is shown as an ALLOCATION flag as the memory is being allocated. The traceback stack component 212 points to the location of the traceback stack 220 populated at step 480. The traceback stack 220 in some embodiments may be located on the memory tag list.

After populating the memory tag 200 at step 500, the memory tag may be stored on the memory tag list along with other memory tags 200 that may currently exist. As referenced above, the previous component 214 may point towards the previous memory tag 200 on the memory tag list and the next component 216 may point towards the next memory tag on the memory tag list, which may be a yet to be populated memory tag 200. The allocation process 400 may then proceed by allocating the memory allocation unit 100 to the application or program making the request.

If a negative decision (e.g., sufficient memory is not available in the memory pool 90) is made at step 420, the process may proceed to step 450 where a memory tag 200 is obtained from the memory pool 90. The memory tag 200 may be populated with similar information to that described above with reference to step 500, for example, an activity type component 202, an allocation address component 204, an allocation size component 206, a task identification (ID) component 208, a stack depth component 210, a traceback stack component 212, a previous flag component 214 and a next flag component 216. However, the activity type for the activity type component 202 is shown as an ALLOCATION ERROR flag, indicating that there was not enough memory for the particular request for memory. The allocation process 400 may then proceed to step 490 where the memory tag 200 is stored on the list in a similar manner to that described with reference to step 520. Then, the memory tool 70 notifies the application or program that there is not enough memory to satisfy the request. Looking at the memory tag 200 created at step 470 and stored at step 490, an inquiry can be made, among other items, as to the size of the memory request and at what location within a program stack it was made.

Figure 8:
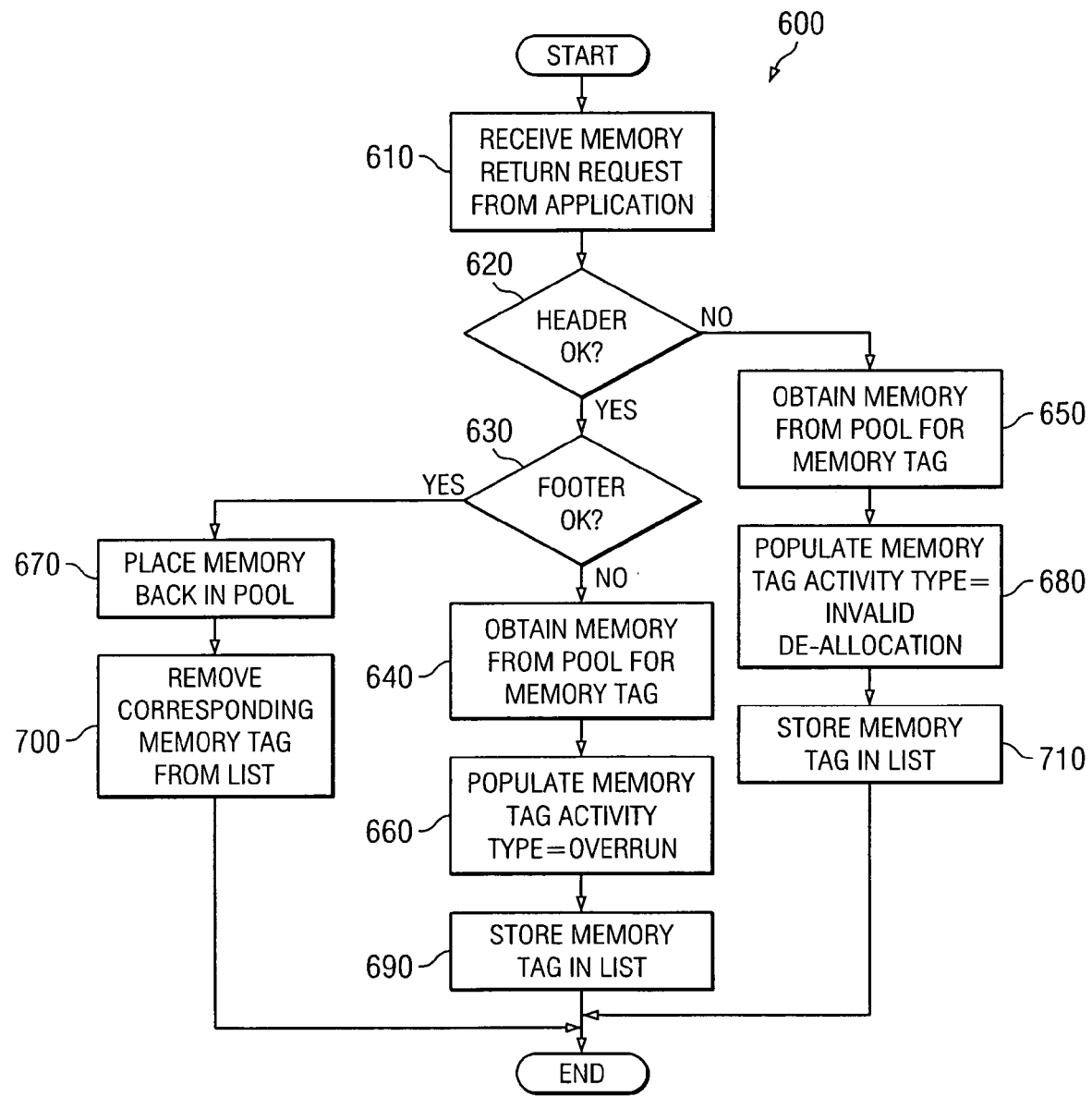
FIG. 8 shows a flow diagram for a de-allocation process, according to an embodiment of the invention.

FIG. 8 shows a flow diagram for a de-allocation process 600, according to an embodiment of the invention. In illustrating the de-allocation process 600 of FIG. 8, reference is also made to FIGS. 2, 3, and 5. After a program or application 80 finishes with a particular memory allocation unit 100, the program or application 80 may return to the memory tool 70. Accordingly, the memory tool 70 may receive a memory return request from the application or program at step 610. Upon receiving the request, the de-allocation process 600 may first look at the header 110 of the memory allocation unit to determine whether the memory allocation unit was issued by the memory tool 70 at step 620, for example, by validating the header 110. If the header 110 validates, the de-allocation process proceeds by determining the integrity of the footer 130 at step 630. In step 630, the memory tool 70 looks to see if the special sequence of data initially placed in the footer 130 is still there. If so, the de-allocation process 600 may proceed to step 670 where the memory allocation unit 100 is placed back in the memory pool 90, being flagged as free memory. Then, the memory tag 200 corresponding to the memory allocation unit 100 may be removed from the memory tag list at step 700. In removing the memory tag 200 from the memory tag list, a variety of counters may still be maintained, for example, to account for the number of times certain events have occurred.

If the header 110 is determined not to be OK at step 620 (e.g., does not validate), the de-allocation process 600 process may proceed to step 650 where a memory tag 200 is obtained. The memory tag 200 may be populated with similar items to that described with reference to step 500 of FIG. 7. However, the activity type of the activity type component 202 has an INVALID DE-ALLOCATION flag, indicating that the memory was never allocated to a particular program. The memory tag 200 may then stored on the audit list at step 710. Information, concerning the attempted de-allocation may be determined upon analyzing the memory tag 200, for example, to determine at what particular stage in a program stack a program or application 80 attempted to return invalid memory.

If a footer 130 does not pass integrity at step 630, the process may proceed to step 640 where a memory tag 200 is obtained. The memory tag 200 is populated with similar items to that described with reference to step 500 of FIG. 7. However, the activity type of the activity type component 202 has an OVERRUN flag, indicating that the application 80 wrote more in the memory allocation unit 100 than the application 80 was allocated. The memory tag 200 may then stored on the audit list at step 690. With this particular allocation, overrun and attempted de-allocation process, two memory tags may be stored: one memory tag 200 with the original allocation and one memory tag 200 with the attempted return, which was determined to be an overrun. Information, concerning the overrun may be determined upon analyzing these memory tags 200.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A method of auditing memory in a system, the method comprising:
   receiving a memory request from an application, the memory request being a request for memory;
   populating a memory tag having a stack depth component and a traceback stack component, the traceback stack component containing a pointer to a traceback stack, the stack depth component defining a size of the traceback stack, and the traceback stack containing information from a program stack associated with the application, the memory tag also including an activity type component defining a type of activity involved in populating the memory tag;
   determining if a memory pool has enough free memory to satisfy the request for memory;
   allocating, from the memory pool, a memory allocation unit if the memory pool has enough free memory to satisfy the request for memory, the memory allocation unit including a data area and a footer, the data area defining an area to which the application may write data, and the footer bounding the data area with a special code;
   receiving a request to return the memory allocation unit;
   determining whether the header of the memory allocation unit is valid; and populating the activity type component with a deallocation failure flag upon determining that the memory allocation unit header is invalid.

2. A method of auditing memory in a system, the method comprising:
   receiving a memory request from an application, the memory request being a request for memory;
   populating a memory tag having a stack depth component and a traceback stack component, the traceback stack component containing a pointer to a traceback stack, the stack depth component defining a size of the traceback stack, and the traceback stack containing information from a program stack associated with the application, the memory tag also including an activity type component defining a type of activity involved in populating the memory tag;
   determining if a memory pool has enough free memory to satisfy the request for memory;
   allocating, from the memory pool, a memory allocation unit if the memory pool has enough free memory to satisfy the request for memory, the memory allocation unit including a data area and a footer, the data area defining an area to which the application may write data, and the footer bounding the data area with a special code;
   receiving a request to return the memory allocation unit;
   determining whether the header of the memory allocation unit is valid;
   determining whether the special code in the footer of the memory allocation unit has changed; and
   populating the activity type component with an overrun flag upon determining that the memory allocation unit header is valid and the special code in the footer has changed.

3. A method of auditing memory in a system, the method comprising:
   receiving a memory request from an application, the memory request being a request for memory;
   populating a memory tag having a stack depth component and a traceback stack component, the traceback stack component containing a pointer to a traceback stack, the stack depth component defining a size of the traceback stack, and the traceback stack containing information from a program stack associated with the application;
   determining if a memory pool has enough free memory to satisfy the request for memory;
   allocating, from the memory pool, a memory allocation unit if the memory pool has enough free memory to satisfy the request for memory, the memory allocation unit including a data area and a footer, the data area defining an area to which the application may write data, and the footer bounding the data area with a special code;
   storing the memory tag in a memory tag list;
   receiving a request to return the memory allocation unit;
   determining whether the header of the memory allocation unit is valid;
   determining whether the special code in the footer of the memory allocation unit has changed;
   returning the memory allocation unit back to the memory pool if the memory allocation unit header is valid and the special code in the footer has not changed; and
   removing the memory tag from the memory tag list after returning the memory allocation unit back to the memory pool.

4. A method of auditing memory in a system, the method comprising:
   receiving a memory request from an application, the memory request being a request for memory;
   populating a memory tag having a stack depth component and a traceback stack component, the traceback stack component containing a pointer to a traceback stack, the stack depth component defining a size of the traceback stack, and the traceback stack containing information from a program stack associated with the application, the memory tag also including an activity type component defining a type of activity involved in populating the memory tag;
   determining if a memory pool has enough free memory to satisfy the request for memory; and
   populating the activity type component with an allocation error flag if the memory pool does not have enough memory to satisfy the request for memory.

5. A method of auditing memory in a system, the method comprising:
   receiving a memory request from an application, the memory request being a request to return a memory allocation unit from an application;
   populating a memory tag having a stack depth component and a traceback stack component, the traceback stack component containing a pointer to a traceback stack, the stack depth component defining a size of the traceback stack, and the traceback stack containing information from a program stack associated with the application, the memory tag also including an activity type component defining a type of activity involved in populating the memory tag;

determining whether the header of the memory allocation unit is valid;

determining whether the special code in the footer of the memory allocation unit has changed; and populating the activity type component with an overrun flag upon determining that the memory allocation unit header is valid and the special code in the footer has changed.

6. The method of claim 5, further comprising:

storing both the traceback stack and the memory tag in a memory tag list.

7. A method of auditing memory in a system, the method comprising:

receiving a request for memory from an application; and allocating, from a memory pool, a memory allocation unit with a data area and a footer, the data area defining an area to which the application may write data, and the footer bounding the data area with a special code; and populating a memory tag having a stack depth component, a traceback stack component, an activity type component, and a task identification component, the traceback stack component containing a pointer to a traceback stack, the stack depth component defining a size of the traceback stack, the traceback stack containing information from a program stack, the activity type component defining a type of activity involved in populating the memory tag, and the task identification component identifying a task in the application associated with the request for memory.

8. The method of claim 7, further comprising:

receiving a request to return the memory allocation unit;

determining whether the header of the memory allocation unit is valid;

determining whether the special code in the footer of the memory allocation unit has changed; and returning the memory allocation unit back to the memory pool if the memory allocation unit header is valid and the special code in the footer has not changed.

9. The method of claim 8, wherein the memory allocation unit further includes a header, further comprising:

validating the header prior to determining whether the footer of the memory allocation unit has changed.

10. The method of claim 7, wherein the memory tag includes an activity type component defining a type of activity involved in populating the memory tag, further comprising:

receiving a request to return the memory allocation unit;

determining whether the header of the memory allocation unit is valid;

determining whether the special code in the footer of the memory allocation unit has changed; and populating the activity type component with an overrun flag upon determining that the memory allocation unit header is valid and the special code in the footer has changed.

* * * * *